United States Patent
Dennis

(10) Patent No.: US 6,588,188 B2
(45) Date of Patent: Jul. 8, 2003

(54) FOOT LIFT CUTTER DECK MOWER UNITS

(75) Inventor: Charles E. Dennis, Selma, AL (US)

(73) Assignee: Bush Hog, L.L.C., Selma, AL (US)

( * ) Notice: Subject to any disclaimer, the term of this patent is extended or adjusted under 35 U.S.C. 154(b) by 0 days.

(21) Appl. No.: 09/755,741

(22) Filed: Jan. 5, 2001

(65) Prior Publication Data

US 2002/0088217 A1 Jul. 11, 2002

(51) Int. Cl.[7] .............................................. A01D 67/00
(52) U.S. Cl. ...................... 56/16.3; 56/14.9; 56/17.1; 56/208; 56/DIG. 22
(58) Field of Search ................................ 56/14.7, 14.9, 56/15.9, 16.7, 17.1, DIG. 22, 12.7, 15.7, 16.3, 208, 210, 214, 217, 17.5

(56) References Cited

U.S. PATENT DOCUMENTS

| | | | |
|---|---|---|---|
| 3,063,226 A | * | 11/1962 | Pfauser ........................ 56/14.9 |
| 3,512,344 A | | 5/1970 | Kortum |
| 3,706,188 A | | 12/1972 | Quiram |
| 3,795,094 A | | 3/1974 | Mollen et al. |
| 4,120,136 A | | 10/1978 | Rose |
| 4,325,211 A | | 4/1982 | Witt et al. |
| 4,577,455 A | | 3/1986 | Amano et al. |
| 4,679,382 A | | 7/1987 | Saruhashi et al. |
| 4,738,327 A | | 4/1988 | Takei |
| 4,760,687 A | * | 8/1988 | Siegrist ........................ 56/15.8 |
| 4,779,406 A | | 10/1988 | Schroeder |
| 4,869,057 A | * | 9/1989 | Siegrist ........................ 56/15.8 |
| 4,920,733 A | | 5/1990 | Berrios |
| 4,958,484 A | | 9/1990 | Busboom |
| 5,042,238 A | | 8/1991 | White, III et al. |
| 5,085,044 A | | 2/1992 | Freier, Jr. et al. |
| 5,129,218 A | | 7/1992 | Youngberg et al. |
| 5,138,825 A | | 8/1992 | Trefz et al. |
| 5,337,543 A | | 8/1994 | Kitamura et al. |
| 5,351,467 A | | 10/1994 | Trefz et al. |
| 5,367,864 A | | 11/1994 | Ogasawara et al. |
| 5,433,066 A | | 7/1995 | Wenzel et al. |
| 5,529,135 A | | 6/1996 | Wenzel et al. |
| 5,765,347 A | | 6/1998 | Wright et al. |
| 5,797,251 A | | 8/1998 | Busboom |
| 5,809,755 A | | 9/1998 | Velke et al. |
| 5,809,756 A | | 9/1998 | Scag et al. |
| 5,816,033 A | | 10/1998 | Busboom et al. |
| 5,832,708 A | | 11/1998 | Sugden |
| 5,845,475 A | | 12/1998 | Busboom et al. |
| 5,865,020 A | | 2/1999 | Busboom et al. |
| 5,927,055 A | * | 7/1999 | Ferree et al. ................. 56/15.9 |
| 5,946,893 A | | 9/1999 | Gordon |
| 5,964,082 A | | 10/1999 | Wright et al. |
| 5,984,031 A | | 11/1999 | Velke et al. |
| 6,212,863 B1 | * | 4/2001 | Thomas ........................ 56/16.7 |
| 6,494,028 B2 | * | 12/2002 | Moore .......................... 56/17.1 |

OTHER PUBLICATIONS

Turf Tiger, "The New King of the Jungle", SCAG, 1997.*
Photos of SCAG Turf Tiger, photos taken Aug. 2000, Turf Tiger published 1997.*
"Ferris Industries The Commercial Mower Spcialist", 90th Anniversary Issue, 1999–2000.
Great Dane "The Most Productive Machines for Professionals", circa 1999.
Turf Tiger "The New King of the Jungle", Scage, 1997.

* cited by examiner

*Primary Examiner*—Robert E. Pezzuto
*Assistant Examiner*—Nathan Mammen
(74) *Attorney, Agent, or Firm*—Cook, Alex, McFarron, Manzo, Cummings & Mehler, Ltd.

(57) ABSTRACT

A foliage mower and height adjustment assembly for a foliage mower are provided. This is a foot-operated adjustment assembly which has a plurality of pivot lugs from which a cutter deck assembly is suspended. Each pivot lug pivots in unison in order to thereby raise or lower the cutter deck. Movement of a foot pedal raises the cutter deck to a transport height, at which the foot pedal is latched in place and the deck height is maintained. A stop mechanism has an adjustable component by which the extent of downward movement of the suspended cutter deck is selected upon release of the latched foot pedal.

25 Claims, 7 Drawing Sheets

FOOT LIFT CUTTER DECK MOWER UNITS

FIELD OF THE INVENTION

This invention generally relates to foliage mowers which have height-adjustable mower decks that are operated by foot pedal action. More particularly, the invention relates to mowers which are of the type having cutter decks which can be selectively raised and lowered between, for example, one or more heights suitable for transport and one or more heights suitable for foliage cutting. The invention facilitates movement among such positions and securement of the cutter deck at the selected position.

BACKGROUND OF THE INVENTION

Foliage cutting vehicles, mowers and implements have long been known which have the ability to raise and lower cutter decks in order to accommodate different cutting heights and/or to facilitate transport. Rose U.S. Pat. No. 4,120,136 shows a tractor having a mower deck which can move vertically through the use of a foot pedal which achieves height adjustment by engagement with one of a plurality of notches adjacent the foot pedal. The position of the pedal in the notches adjusts the position of a lift linkage and thus of the cutter deck. Trefz et al U.S. Pat Nos. 5,138,825 and 5,351,467 describe riding lawn mowers having pedal operated height adjustment mechanisms. Notched or threaded mechanisms remote from the foot pedal cooperate in the raising and lowering function. Gordon U.S. Pat. No. 5,946,893 employs a deck lift mechanism wherein a foot pedal arm engages a height pin for giving a desired cutting height, while requiring a linkage which connects a foot pedal arm to a forward pivot rod, as well as independent suspension structures. Busboom et al U.S. Pat. No. 5,816,033 shows a hand-operated control lever and linkage arrangement. An arcuate frame is adjacent the manual control lever, these two components being laterally offset from each other.

Foot-operated lift mechanisms have different operational advantages from hand-operated lift mechanisms. In many circumstances, a foot-operated mechanism can more readily allow the user to provide the leverage and force needed to achieve vertical movement of a unit having substantial weight, such as a cutter deck and blade assembly of an industrial or professional quality mower. Heretofore, foot-operated lift mechanisms for mower decks, such as those noted above, utilize complicated adjustment mechanisms or linkage mechanisms. These can increase the cost and/or reduce the reliability of the adjustable height cutter decks.

SUMMARY OF THE INVENTION

In accordance with the present invention, a foliage mower and mower deck lift mechanism therefor are provided. The deck height lifting is practiced by foot pedal depression which directly lifts the cutter deck. Pivot lugs of a height adjustment assembly interconnect by a push-pull rod assembly to insure that the cutter deck is lifted uniformly. Its corners preferably are moved simultaneously, either upwardly or downwardly, to the same extent. This height adjustment assembly further includes a stop mechanism which prevents downward movement of the cutter deck beyond any one of a selectable plurality of deck height levels during the action of cutter deck lowering. The invention is suitable for mid-mounted cutter decks of mowers, self-propelled riding mowers, vehicles or implements. Mid-mount mowers having self-propelled capabilities and very tight turning radius attributes, such as those having a turning radius approximating zero, find special application for this invention.

It is accordingly a general object of the present invention to provide an improved foliage mower structure having one or more cutter decks having a height adjustment feature which includes foot pedal operation.

Another object of this invention is to provide an improved self-propelled riding foliage mower having a foot-operated deck height adjustment assembly which provides for sure and positive uniform deck movement in the vertical direction.

Another object of the present invention is to provide an improved foot-operated cutter deck lift mechanism which affords direct lift control when the foot pedal is depressed.

Another object of the present invention is to provide an improved self-propelled foliage mower and deck lift mechanism which incorporate a stop mechanism to maintain an selected desired deck height.

These and other objects, features and advantageous of the present invention will be apparent from and clearly understood through a consideration of the following detailed description.

BRIEF DESCRIPTION OF THE DRAWINGS

In the course of this description, reference will be made to the attached drawings, wherein.

DESCRIPTION OF THE PREFERRED EMBODIMENTS

Figure 1:
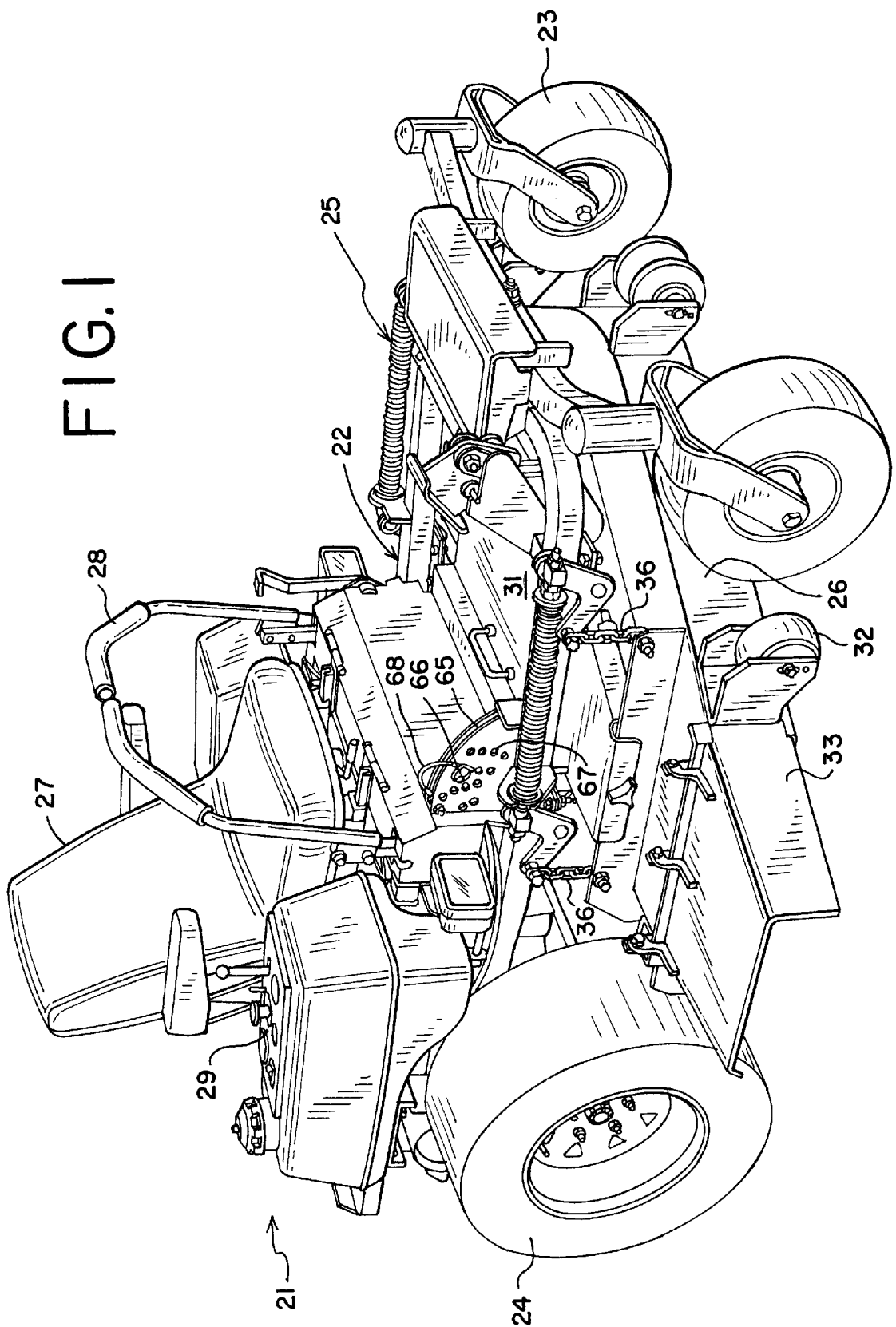
FIG. 1 is a perspective view of a typical self-propelled riding foliage mower incorporating the deck lift mechanism according to the invention.

An example of the type of foliage mower which can incorporate the features of this invention, generally designated as 21, is shown in FIG. 1. This particular version is a self-propelled riding mower which affords a minimal turning radius such that the mower virtually pivots within its own footprint in order to change direction of movement. Mower 21 includes a body assembly or chassis, generally designated as 22, to which are secured for rotation in a known manner, front wheels 23 and rear wheels 24. The deck height adjustment assembly is generally designated as 25. A cutting deck 26 is suspended from the height adjusting assembly 25.

Mower 21 is shown with other features which are typical of these types of mowers. Included is a seat 27, within which the operator sits forwardly, facing in the direction of the front wheels 23. A steering control mechanism is shown at 28. Also shown is a control panel 29 and a foot deck 31. It will be appreciated that the motive power source for this self-propelled machine is located within the generally enclosed area beneath the seat 27. Some further details concerning the mower structure can be seen in FIG. 2 and FIG. 3.

With further reference to the cutter deck 26, the illustrated embodiment includes deck wheels 32 which can, under appropriate circumstances, engage the ground over which the mower rides during cutting. Discharge chute 33 can be provided for directing the exit of clippings from the cutter deck when a side discharge approach is to be used. If a mulching deck is provided, typically this discharge chute will be omitted. Also shown in the illustrated cutter deck is a blade assembly 34, associated with a driving mechanism 35. These can be of typical generally known construction. It will be appreciated that the motive power source will rotate the blade assembly through the driving mechanism, as well as impart driving rotation to at least the rear wheels 24.

In the illustrated embodiment, operative communication between the cutting deck 26 and the deck height adjusting assembly 25 is provided by a plurality of suspending members 36, such as the illustrated chain lengths. Other structures are possible, provided they are durable and able to withstand exposure to weather conditions. An example of a suitable alternative to the chain lengths are lengths of metal cable such as so-called airplane cable. While rigid rod lengths could be used, they could be less desirable than flexible suspension members, which can accommodate ground unevenness and obstacles to a certain extent.

Figure 4:
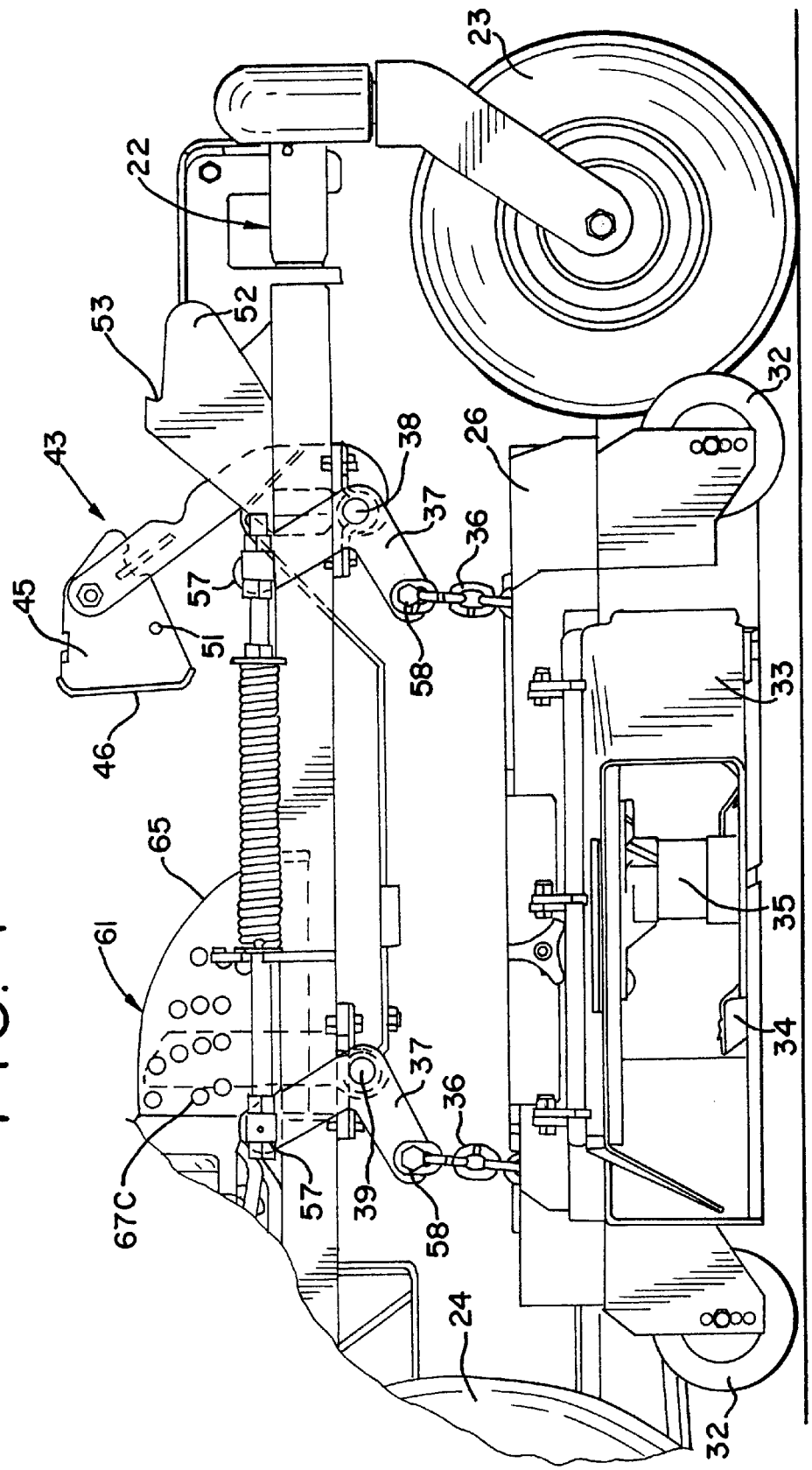
FIG. 4 is an enlarged, detail elevational view of a portion of FIG. 2, but showing the cutter deck in a mowing position.
Figure 5:
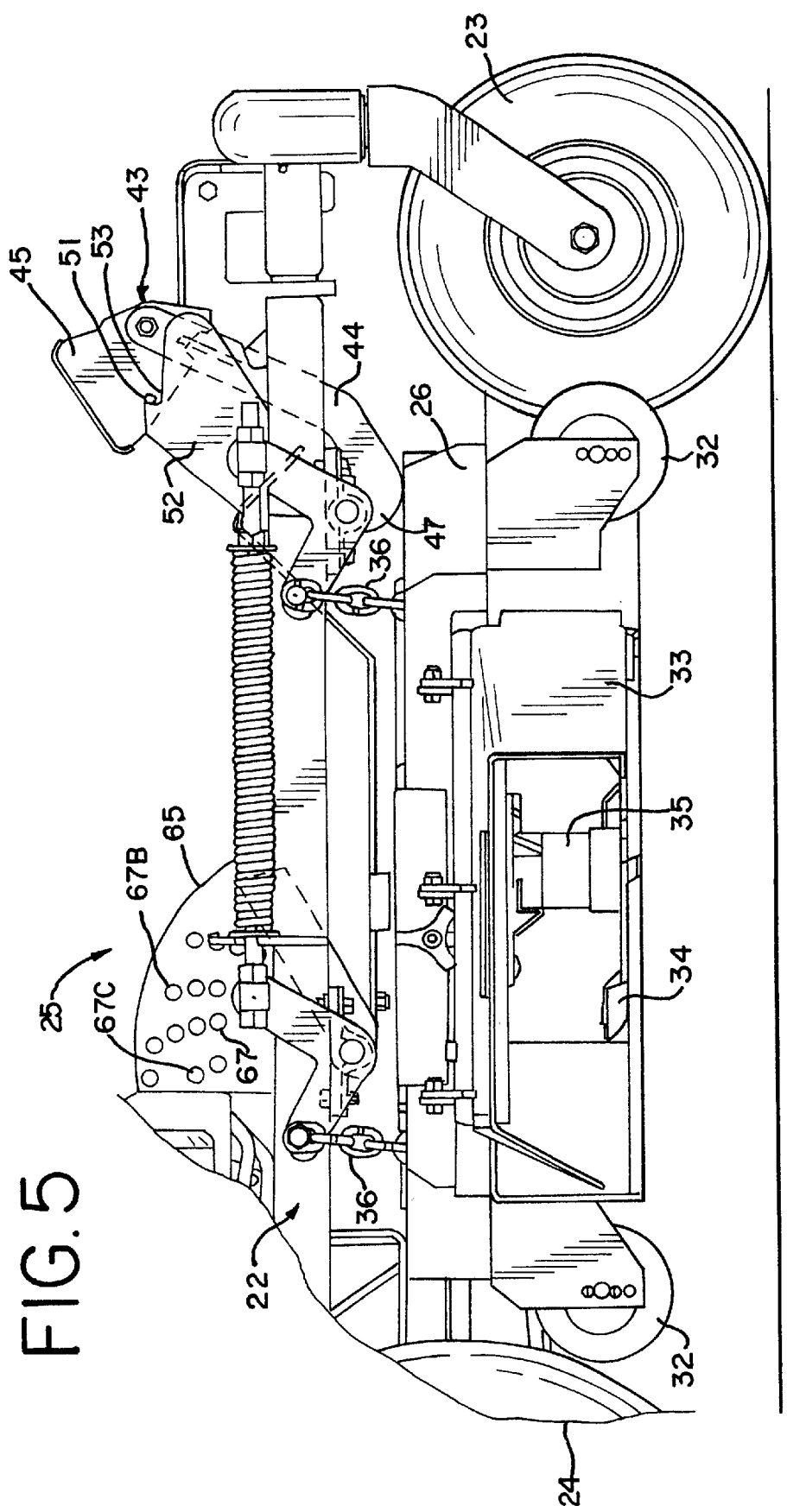
FIG. 5 is a view similar to FIG. 4, with the deck in a raised position.
Figure 6:
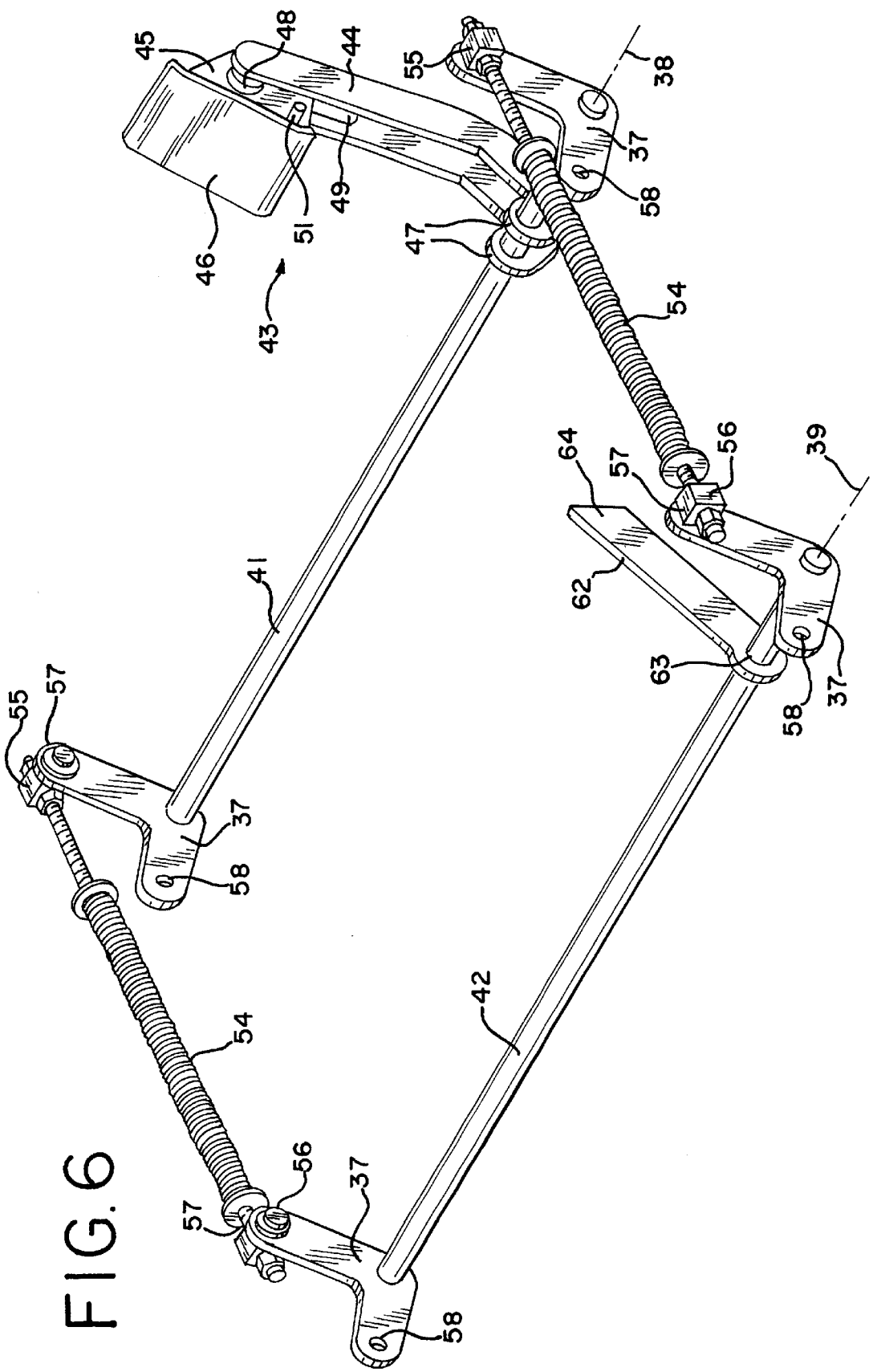
FIG. 6 is a perspective view illustrating features of a preferred height adjustment assembly according to the invention.

With further reference to the deck height adjustment assembly, further details of the preferred embodiment which is illustrated can be found in FIG. 4, FIG. 5, FIG. 6, FIG. 7 and FIG. 8. A plurality of pivot lugs are shown directly supporting the suspension members and thus the cutter deck from the body assembly or chassis. Four such pivot lugs are shown. Each pivot lug is pivotally mounted with respect to the chassis along a pivot axis 38 or 39 (FIG. 6). In the illustrated embodiment, pivot rods 41 and 42 lie along the respective pivot axes 38 and 39. In that instance, the pivot rods are pivotally mounted to the chassis, and pivot lugs are rigidly secured at opposite end portions of each pivot rod.

Also directly secured, such as by welding, to a pivot rod 41 is a foot pedal assembly, generally designated as 43. In this embodiment, a foot lift lug 44 is welded to the pivot rod 41 at one end and supports a pedal support bracket 45 at the other end. A pedal plate 46 is secured to the pedal support bracket, with the result that depression of the pedal plate by the foot of the operator directly results in rotation of the pivot rod 41. It will be noted that this connection between the foot lift lug 44 and the pivot rod 41 is devoid of any linkage so as to provide substantially one-two-one direct movement of the pivot rod 41 in response to movement of an attachment end 47 of the foot lift lug 44. Foot pedal assembly 43 also can include a pedal bushing 48 and a foot lift stiffener 49. Also included is a pedal latching pin 51.

Figure 2:
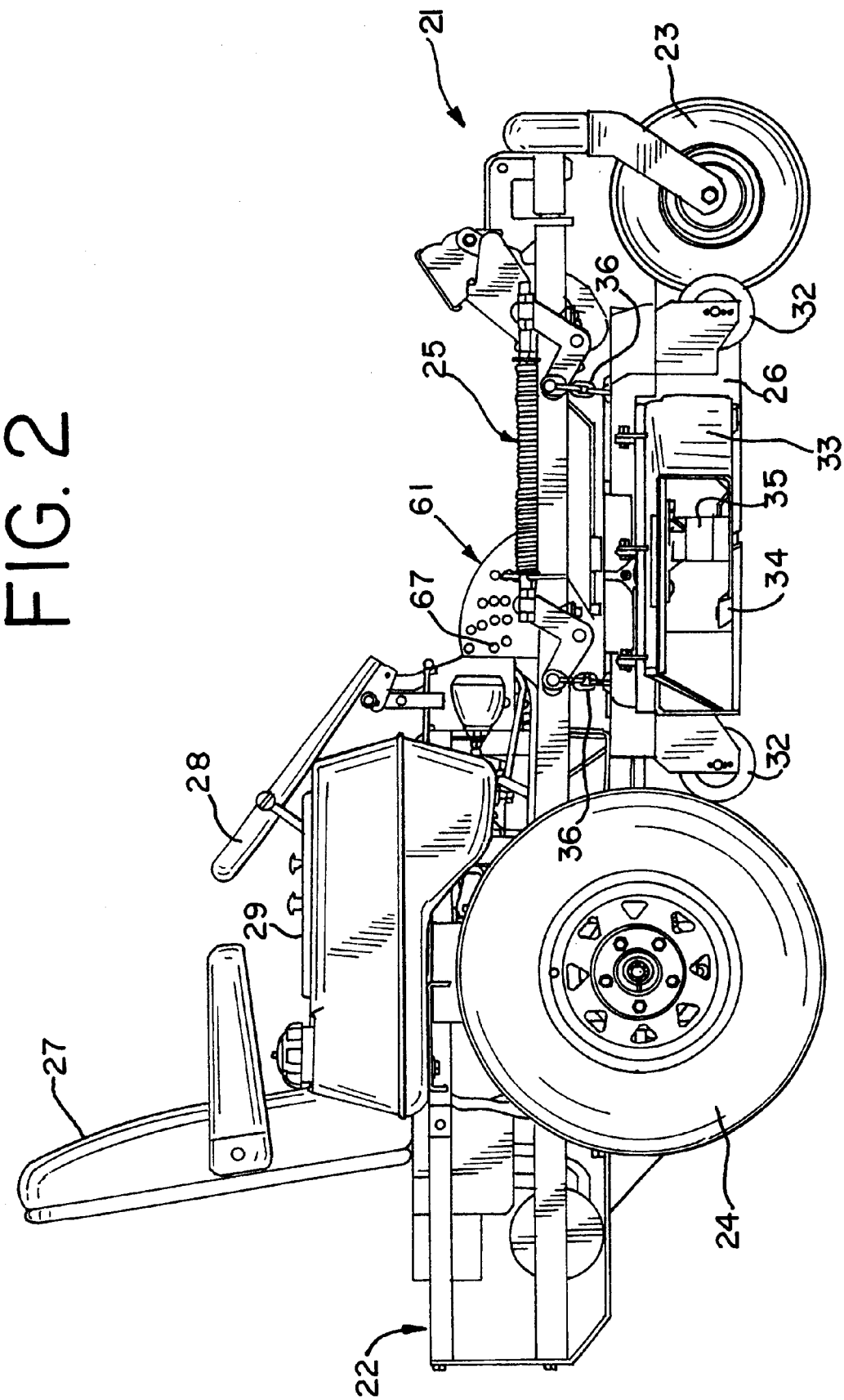
FIG. 2 is an elevational right side view of the mower shown in FIG. 1, with the deck being in a transport position.
Figure 3:
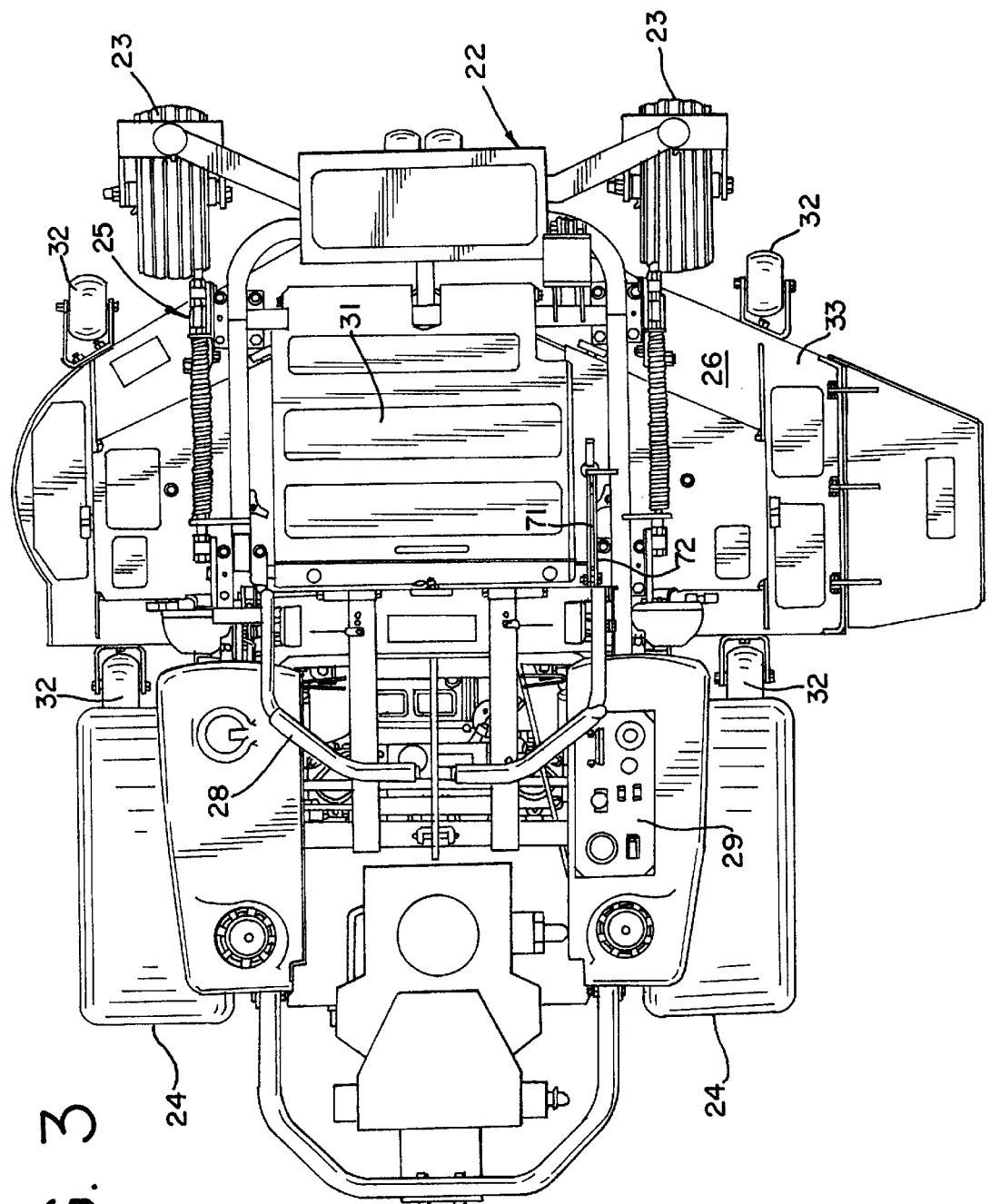
FIG. 3 is a top plan view of the mower illustrated in FIG. 1.
Figure 7:
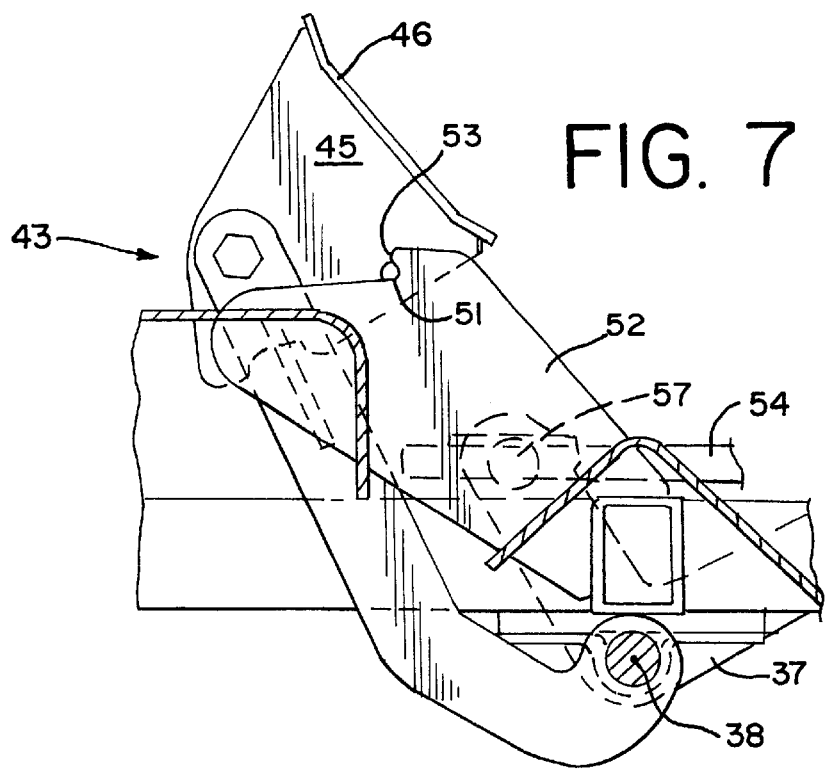
FIG. 7 is an elevational view from the left side of the foot pedal assembly of the illustrated embodiment.

Pedal latching pin 51 is positioned for latching engagement with a component of, or attachment to, the chassis, such as the illustrated upstanding bracket 52 which has a catch formation 53. It will be appreciated that the pin 51 and catch 53 cooperate to lock the foot pedal in place when desired. Different positions in this regard will be noted by comparing the position of the foot pedal assembly 43 in its movement from a released position as shown in FIG. 4 to a secured position as shown in FIG. 2, FIG. 5 and FIG. 7. At this latter position, the cutter deck 26 is raised to a transport position. This is secured by engagement between the pedal latching pin 51 and the catch formation 53. As is discussed more fully herein, the release position illustrated in FIG. 4 signifies that the cutter deck is in a cutting orientation, which is adjusted as discussed herein. It will be appreciated that the weight of the cutter deck biases the foot pedal assembly 43 to the FIG. 4 orientation, as well as biases the pedal latching pin 51 within the catch formation of 53 when the unit is at the FIG. 5 orientation.

Deck height adjusting assembly 25 includes a push-pull rod 54. Two such rods are shown, each connecting a pair of pivot lugs 37, one a forward lug, and the other a rearward lug. Suitable pivot connections are provided between the rods and end portions of the lugs. For example, pivot connections 55, 56 are shown, with two being connections at a forward portion of the assembly and two being at a rearward portion of the assembly. A result of this type of structure is that each pivot lug 37 moves simultaneously and with the same degree of travel as the attachment end 47 of the foot pedal assembly 43. This helps to insure smooth and even vertical movement and suspension of the cutter deck 26. In essence, the rear pivot rod weldment or assembly moves in unison with the forward pivot rod weldment or assembly. In addition, each pivot rod 41, 42 functions as a deck height adjusting pivot rod. Similarly, each pivot lug 37, which is essentially an L-shaped bracket, functions as a height adjustment pivot lug. More particularly, each pivot lug has a first connection site 57 (which receives the push-pull rods) and a generally opposing second connection site 58. Swinging movement of the first connections sites results in corresponding swinging movement of the second connection sites, thereby raising or lowering the cutting deck 26.

A stop mechanism generally designated as 61 is provided in order to selectively prevent downward movement of the cutting deck beyond a height which is selected by the operator. This is shown in some detail in FIG. 1, FIG. 3, FIG. 4, FIG. 5 and FIG. 8. A component of this mechanism is a deck height adjusting lug 62. This is rigidly secured, such as by welding, to the pivot weld 42 at an attachment end 63, which is generally opposite a free end 64. It will be appreciated that the deck height adjusting lug, and particularly its free end portion 64, will rotate with the pivot rod 42 and thus with all of the pivot lugs 37. Accordingly, there is a direct relationship between movement of the deck height adjusting lug 62 and the second connection sites. As previously noted, movement of the second connection sites translates to vertical movement of the cutting deck 26.

Figure 8:
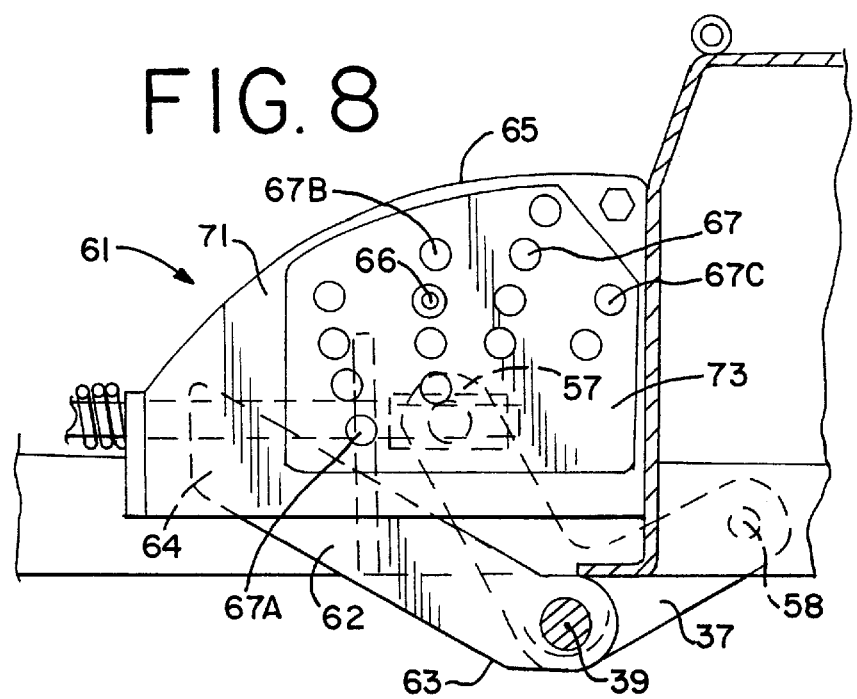
FIG. 8 is an enlarged detail left side view of the preferred stop mechanism of the illustrated embodiment.

Turning now to FIG. 8, the deck height adjustment lug 62 has an adjacent relationship with an apertured panel 65. A rigid member 66, such as the illustrated pin, is sized and shaped so as to securely fit into any of the apertures 67 of the panel 65. When such a pin is used, it is preferable to include a suitable lanyard 68, such as a cable lanyard (FIG. 1). As can be appreciated from FIG. 8, pin 66 can be inserted into any of the apertures 67, as desired. It will be noted that, once thus inserted, a portion of the deck height adjustment lug 62 will engage, and thus be stopped by, the inserted rigid member 66. The rigid member is moved to a different aperture depending upon the mowing or cutting height which is desired. Thus, the placement of the rigid member determines the cutting height when the foot pedal assembly is released; that is, the pedal is no longer in the forward position and held by the catch formation 53, allowing the cutting deck 26 to drop, thereby rotating the lug 37 and thus the deck height adjusting lug 62 until it engages the rigid member 66.

In the embodiment as shown in FIG. 8, placing the rigid member 66 into the aperture 67A would result in the most elevated cutting height of those illustrated in FIG. 8. Movement to aperture 67B would result in a generally intermediate cutting height, and movement to aperture 67C would result in the lowest elevation of cutting height available in this illustrated embodiment. This last condition is illustrated in FIG. 4, while the first condition is illustrated in FIG. 5.

While apertured panel 65 can function adequately as a single plate having the indicated apertures, it is preferable to provide closely spaced plates 71 and 72 between which the deck height adjusting lug 62 can move. With this structure, the rigid member 66 is supported at two locations on closely spaced opposite sides of the location at which the rigid member is engaged by the deck height adjusting lug 62. This helps to reduce wear and insure a secure stop. When desired, an aperture template 73 can be included in order to provide guidance as to the relative cutting heights obtained by placement of the rigid member within each particular aperture. If desired, each aperture can be marked with a suitable approximate cutting height, defined as the distance between the bottom surface of the cutting blade(s) and the ground.

With particular reference to the operation of a mower incorporating a deck height adjustment mechanism according to the invention, the operator will first set the mower in an off condition with the blades disengaged and not rotating. The operator then depresses the deck lift foot pedal so as to raise the cutting deck to the transport position when the pedal is placed in the locked condition at a forward location of the pedal. This will permit the mower to be transported, if that is the desired activity, in which case there is no need to first shut down the mower. With the mower shut down as indicated, the operator may insert a height adjustment pin into the hole corresponding to the desired cutting height, for example as indicated by a decal on a side of the deck lift plate. With this accomplished, the deck lift pedal is unlatched by being depressed by the operator and moved to a clear position, and the deck is allowed to lower until the selected height adjustment pin is engaged. This moves the cutter deck to the selected mowing height. When desired to change that cutting height, the process is essentially repeated so that the height adjustment pin can be moved to a different hole to effect the desired new cutting height.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A self-propelled riding foliage mower comprising:
    a body assembly having a forward end, a rearward end, ground-engaging wheels and a motive unit for propelling the mower across the ground;
    a cutter deck adjustably suspended from the body assembly for movement between an elevated transport height and at least one cutting height which is less than said transport height;
    a foot-operated height adjustment assembly supported by said body assembly;
    said height adjustment assembly including a plurality of pivot lugs which pivot with respect to said body assembly, each pivot lug having a first connection site and a second connection site, said cutter deck being suspended from a plurality of said pivot lug second connection sites, at least one of said pivot lugs being a forward pivot lug at a portion of said body assembly which is forward of another said pivot lug that is a rearward pivot lug;
    said height adjusting assembly also including a push-pull rod connecting said first connection site of a said forward pivot lug with said first connection site of said rearward pivot lug;
    a foot pedal component drivingly engaging at least one of said forward pivot lugs, said body assembly having an upstanding component, said foot pedal component and said upstanding component cooperating to impart either a secured position or a released position to the foot pedal component, whereby movement of said foot pedal component in one direction, which is toward the forward end of the body assembly and to the secured position, pivots said forward pivot lug and also said rearward pivot lug, through said push-pull rod, and raises said cutter deck suspended from said pivot lugs without lifting assistance from another component, and movement of said foot pedal component in an opposite direction, which is toward the rearward end of the body assembly and to the released position, allows gravity lowering of said cutter deck;
    said foot pedal component lockingly engaging said upstanding component when the foot pedal component is in a forwardmost position in order to maintain said secured position of the foot pedal component, and said foot pedal component is disengaged from said upstanding component in order to attain said released position; and
    a stop mechanism distinct from said foot pedal component which prevents downward movement of said cutter deck beyond one of a selectable plurality of deck height levels in order to limit said gravity lowering of the cutter deck, said foot pedal component being disengaged from said upstanding component when said cutter deck is at said one of a selectable plurality of deck height levels.

2. The foliage mower in accordance with claim 1, wherein said cutter deck is positioned between the ground-engaging wheels so as to provide a mid-mount mower unit.

3. The foliage mower in accordance with claim 1, wherein said foot operated height adjustment assembly is pivotally attached to said body assembly.

4. The foliage mower in accordance with claim 1, wherein said cutter deck is suspended from said height adjustment assembly by suspension members.

5. The foliage mower in accordance with claim 1, wherein said height adjustment assembly further includes a first pivot rod rigidly connecting said forward pivot lug with another said forward pivot lug, and said height adjustment assembly further includes a second pivot rod connecting said rearward pivot lug with another rearward pivot lug.

6. The foliage mower in accordance with claim 1, wherein said foot pedal component has a latching projection, said upstanding member has a catch formation, and said latching projection rests within said catch formation when the foot pedal component is in said forwardmost position.

7. The foliage mower in accordance with claim 1, wherein said stop mechanism includes a deck height adjustment lug in rigid operative engagement with one of said pivot lugs, said rigid operative engagement including having said deck height adjustment lug and said pivot lug rotate simultaneously.

8. The foliage mower in accordance with claim 7, further including a pivot rod having an axis along which also lie two said pivot lugs and said deck height adjustment lug, and these pivot lugs and deck height adjustment lug are rigidly secured to said pivot rod, and said pivot rod is rotatably mounted with respect to the body assembly.

9. The foliage mower in accordance with claim 7, wherein said stop mechanism includes an apertured panel, said stop member is a rigid member, and said stop member is selectively positioned in any of a plurality of apertures of the apertured panel, whereby the deck height level is adjusted.

10. The foliage mower in accordance with claim 9, wherein said apertured panel comprises a plurality of closely spaced plates, and said deck height adjustment lug is slidably moveable between these plates.

11. The foliage mower in accordance with claim 1, wherein said push-pull rod is pivotally connected to said forward pivot lug and to said rearward pivot lug.

12. A foliage mower, comprising:
   a body assembly having a forward end, a rearward end, and ground-engaging wheels for transporting the mower across the ground;
   a cutter deck adjustably suspended from the body assembly at a location between a forward one of said ground-engaging wheels and rearward one of said ground-engaging wheels, the cutter deck being moveable between an elevated transport height and at least one cutting height which is vertically lower than the transport height;
   a foot-operated height adjustment assembly supported by said body assembly, said cutter deck being suspended from said height adjustment assembly;
   said height adjustment assembly including a first pivot rod which is toward said forward end of the body assembly and is pivotally mounted with respect to said body assembly, a plurality of pivot lugs secured to said first pivot rod, and a foot pedal component rigidly secured to said first pivot rod;
   said height adjustment assembly further including a second pivot rod which is toward said rearward end of the body assembly and has a plurality of pivot lugs secured thereto, a deck height adjusting lug secured to the second pivot rod, said second pivot rod being pivotally mounted with respect to the body assembly;
   a push-pull rod connecting a pivot lug of said first pivot rod to a pivot lug of said pivot rod;
   a stop mechanism distinct from said foot pedal component and having a stop member which engages said deck height adjusting lug, whereby downward movement of said cutter deck is stopped, the stop member being adjustable with respect to said deck height adjusting lug, whereby one of a plurality of deck height levels is selected;
   said foot pedal component is associated with a latching structure when the foot pedal component is in a forward orientation which is toward the forward end of the body assembly, and engagement between said foot pedal component and said latching structure imparts a secured position whereby said foot pedal component is secured in said forward orientation and said cutter deck is secured at its said elevated transport height; and
   said foot pedal component is disengaged from the latching structure in order to attain a released position of the foot pedal component from the latching structure while allowing the cutter deck movement to the deck height level which had been selected, and is also disengaged when said cutter deck is in said one of a plurality of selected deck height levels.

13. The foliage mower in accordance with claim 12, wherein said cutter deck is suspended from said height adjustment assembly by suspension members.

14. The foliage mower in accordance with claim 12, further including an upstanding component associated with the body assembly, wherein said foot pedal component lockingly engages said upstanding component when the foot pedal component is in a forwardmost position, and wherein said foot pedal component has a latching pin, said upstanding component has a catch formation, and said latching pin rests within said catch formation when the foot pedal component is in said forwardmost position.

15. The foliage mower in accordance with claim 12, further including a pivot rod having an axis along which also lie two said pivot lugs and said deck height adjustment lug, and these pivot lugs and deck height adjustment lug are rigidly secured to said pivot rod, and said pivot rod is rotatably mounted with respect to the body assembly.

16. The foliage mower in accordance with claim 12, wherein said stop mechanism includes an apertured panel, said stop member is a rigid member, and said stop member is selectively positioned in any of a plurality of apertures of the apertured panel, whereby the deck height level is adjusted.

17. The foliage mower in accordance with claim 16, wherein said apertured panel comprises a plurality of closely spaced plates, and said deck height adjustment lug is slidably moveable between these plates.

18. A foot-operated height adjusting assembly for a vertically moveable cutter deck of a foliage mower, comprising:
   a plurality of pivotally mounted pivot lugs, each pivot lug having a first connection site and a second connection site, each said second connection site adapted to suspend therefrom a cutter deck for a foliage mower, at least one of said pivot lugs being a forward pivot lug, and another of said pivot lugs being a rearward pivot lug;
   a push-pull rod connecting said first connection site of a said forward pivot lug with said first connection site of a said rearward pivot lug;
   a foot pedal component drivingly engaging at least one of said forward pivot lugs, said foliage mower having an upstanding component, said foot pedal component and said upstanding component cooperating to impart either a secured position or a released position to the foot pedal component, whereby pushing of said foot pedal component in a generally forward direction pivots said forward pivot lug and also said rearward pivot lug, through said push-pull rod, and raises the cutter deck suspended from said pivot lugs without lifting assistance from another component and until the cutter deck is at a raised position which is maintained by locking engagement of the foot pedal component to the secured position, and release of said locking engagement allows movement of said foot pedal component in a generally rearward direction to the released position and allows gravity lowering of said cutter deck;
   said foot pedal component lockingly engages said upstanding component when the foot pedal component is in a fowardmost position in order to maintain said secured position of the foot pedal component, and said foot pedal component is disengaged from said upstanding component in order to attain said released position; and
   a stop mechanism distinct from said foot pedal component which prevents downward movement of the cutter deck beyond one of a selectable plurality of deck height levels in order to limit said gravity lowering of the cutter deck, said foot pedal component being disengaged from said upstanding component when said cutter deck is at said one of a selectable plurality of deck height levels.

19. The height adjustment assembly in accordance with claim 18, wherein said height adjustment assembly further includes a first pivot rod rigidly connecting one said forward pivot lug with another said forward pivot lug, and said assembly further includes a second pivot rod connecting one said rearward pivot lug with another said rearward pivot lug.

20. The height adjustment assembly in accordance with claim 18, wherein said foot pedal component has a latching pin, said upstanding component has a catch formation, and said latching pin rests within said catch formation when the foot pedal component is in said forwardmost, latched position.

21. The height adjustment assembly in accordance with claim 18, wherein said stop mechanism includes a deck height adjustment lug in rigid operative relationship with one of said pivot lugs, said rigid operative engagement including having said deck height adjusting lug and said pivot lug rotate simultaneously.

22. The height adjustment assembly in accordance with claim 21, further including a pivot rod having an axis along which also lie two said pivot lugs and said deck height adjusting lug, and these pivot lugs and deck height adjusting lug are rigidly secured to said pivot rod, and said pivot rod is rotatably mounted with respect to the body assembly.

23. The height adjustment assembly in accordance with claim 15, wherein said stop mechanism includes an apertured panel and a stop member, said stop member is a rigid member, and said stop member is selectively positioned in any of a plurality of apertures of the apertured panel, whereby the deck height level is adjusted.

24. The height adjustment assembly in accordance with claim 23, wherein said apertured panel comprises two closely spaced plates, and said deck height adjusting lug is slidably moveable between these two plates.

25. The height adjustment assembly in accordance with claim 18, wherein said push-pull rod is pivotally connected to one said forward pivot lug and to one said rearward pivot lug.

\* \* \* \* \*

UNITED STATES PATENT AND TRADEMARK OFFICE
CERTIFICATE OF CORRECTION

PATENT NO. : 6,588,188 B2
DATED : July 8, 2003
INVENTOR(S) : Charles E. Dennis

It is certified that error appears in the above-identified patent and that said Letters Patent is hereby corrected as shown below:

Title page,
Item [56], References Cited, OTHER PUBLICATIONS, delete "Turf Tiger 'The New King of the Jungle, Scage, 1997'".

Column 2,
Line 18, delete "advantageous" insert -- advantages --.

Column 3,
Line 46, delete "one-two-one" insert -- one-to-one --.

Column 4,
Line 22, delete "connections" insert -- connection --.

Column 10,
Line 2, delete "15" insert -- 18 --.

Signed and Sealed this

Twenty-second Day of June, 2004

JON W. DUDAS
*Acting Director of the United States Patent and Trademark Office*